United States Patent
Sittig et al.

(10) Patent No.: US 8,583,690 B2
(45) Date of Patent: *Nov. 12, 2013

(54) MANAGING INFORMATION ABOUT RELATIONSHIPS IN A SOCIAL NETWORK VIA A SOCIAL TIMELINE

(75) Inventors: Aaron Sittig, San Francisco, CA (US); Mark E. Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/338,084

(22) Filed: Dec. 27, 2011

(65) Prior Publication Data

US 2012/0096037 A1    Apr. 19, 2012

Related U.S. Application Data

(63) Continuation of application No. 12/757,873, filed on Apr. 9, 2010, now Pat. No. 8,099,433, which is a continuation of application No. 11/646,206, filed on Dec. 26, 2006, now Pat. No. 7,725,492.

(60) Provisional application No. 60/753,810, filed on Dec. 23, 2005.

(51) Int. Cl.
*G06F 17/30*    (2006.01)

(52) U.S. Cl.
USPC .......................................................... 707/784

(58) Field of Classification Search
USPC .......................................................... 707/784
See application file for complete search history.

(56) References Cited

U.S. PATENT DOCUMENTS

| | | | | |
|---|---|---|---|---|
| 7,725,492 B2 * | 5/2010 | Sittig et al. | | 707/784 |
| 7,840,604 B2 * | 11/2010 | Zhu et al. | | 707/802 |
| 8,099,433 B2 * | 1/2012 | Sittig et al. | | 707/784 |
| 2004/0221309 A1 * | 11/2004 | Zaner et al. | | 725/46 |
| 2008/0301094 A1 * | 12/2008 | Zhu et al. | | 707/3 |
| 2008/0301095 A1 * | 12/2008 | Zhu et al. | | 707/3 |
| 2008/0301120 A1 * | 12/2008 | Zhu et al. | | 707/5 |
| 2011/0119613 A1 * | 5/2011 | Zhu et al. | | 715/771 |
| 2012/0150978 A1 * | 6/2012 | Monaco et al. | | 709/206 |
| 2013/0073970 A1 * | 3/2013 | Piantino et al. | | 715/738 |
| 2013/0073971 A1 * | 3/2013 | Huang et al. | | 715/738 |
| 2013/0073972 A1 * | 3/2013 | Yung et al. | | 715/738 |
| 2013/0073976 A1 * | 3/2013 | McDonald et al. | | 715/739 |
| 2013/0073984 A1 * | 3/2013 | Lessin et al. | | 715/753 |
| 2013/0073985 A1 * | 3/2013 | Hamlin et al. | | 715/753 |
| 2013/0073995 A1 * | 3/2013 | Piantino et al. | | 715/764 |

OTHER PUBLICATIONS

United States Patent and Trademark Office, Non-Final Office Action, U.S. Appl. No. 13/338,086, Nov. 30, 2012, ten pages.
U.S. Office Action, U.S. Appl. No. 13/338,086, May 16, 2013, thirteen pages.

* cited by examiner

*Primary Examiner* — Sheree Brown
(74) *Attorney, Agent, or Firm* — Fenwick & West LLP

(57) ABSTRACT

A system, method, and computer program for generating a social timeline is provided. A plurality of data items associated with at least one relationship between users associated with a social network is received, each data item having an associated time. The data items are ordered according to the at least one relationship. A social timeline is generated according to the ordered data items.

25 Claims, 7 Drawing Sheets

MANAGING INFORMATION ABOUT RELATIONSHIPS IN A SOCIAL NETWORK VIA A SOCIAL TIMELINE

CROSS REFERENCE TO RELATED APPLICATIONS

This application is a continuation of U.S. application Ser. No. 12/757,873, filed Apr. 9, 2010, which is a continuation of U.S. application Ser. No. 11/646,206, filed Dec. 26, 2006, which claims the benefit of U.S. Provisional Application No. 60/753,810, filed Dec. 23, 2005. Each of the foregoing applications is incorporated by reference in its entirety.

BACKGROUND

The present invention relates generally to social networking, and more particularly to systems and methods for generating a social timeline.

Conventionally, people have networked with one another by joining social clubs, attending social events, meeting friends through other friends, and so forth. The Internet has made keeping in touch with friends and acquaintances more convenient for many people. For other people, the Internet provides a social forum for networking and meeting new people.

For many people, the Internet more recently represents the principal way in which the people meet new friends and remain in touch with existing friends. Thus, the Internet provides a medium for a complex array of interactions between vast numbers of individuals.

In order to facilitate communications between the vast numbers of individuals, various social networking websites have developed in recent years. Social networking websites can provide organizational tools and forums for allowing these individuals to interact with one anther via the social networking website. Many users prefer to limit communications to specific groups of other users.

SUMMARY

The present invention provides a system and method for generating a social timeline. A plurality of data items associated with at least one relationship between users associated with a social network is received, each data item having an associated time. The data items are ordered according to the at least one relationship. A social timeline is generated according to the ordered data items.

DETAILED DESCRIPTION

Figure 1:
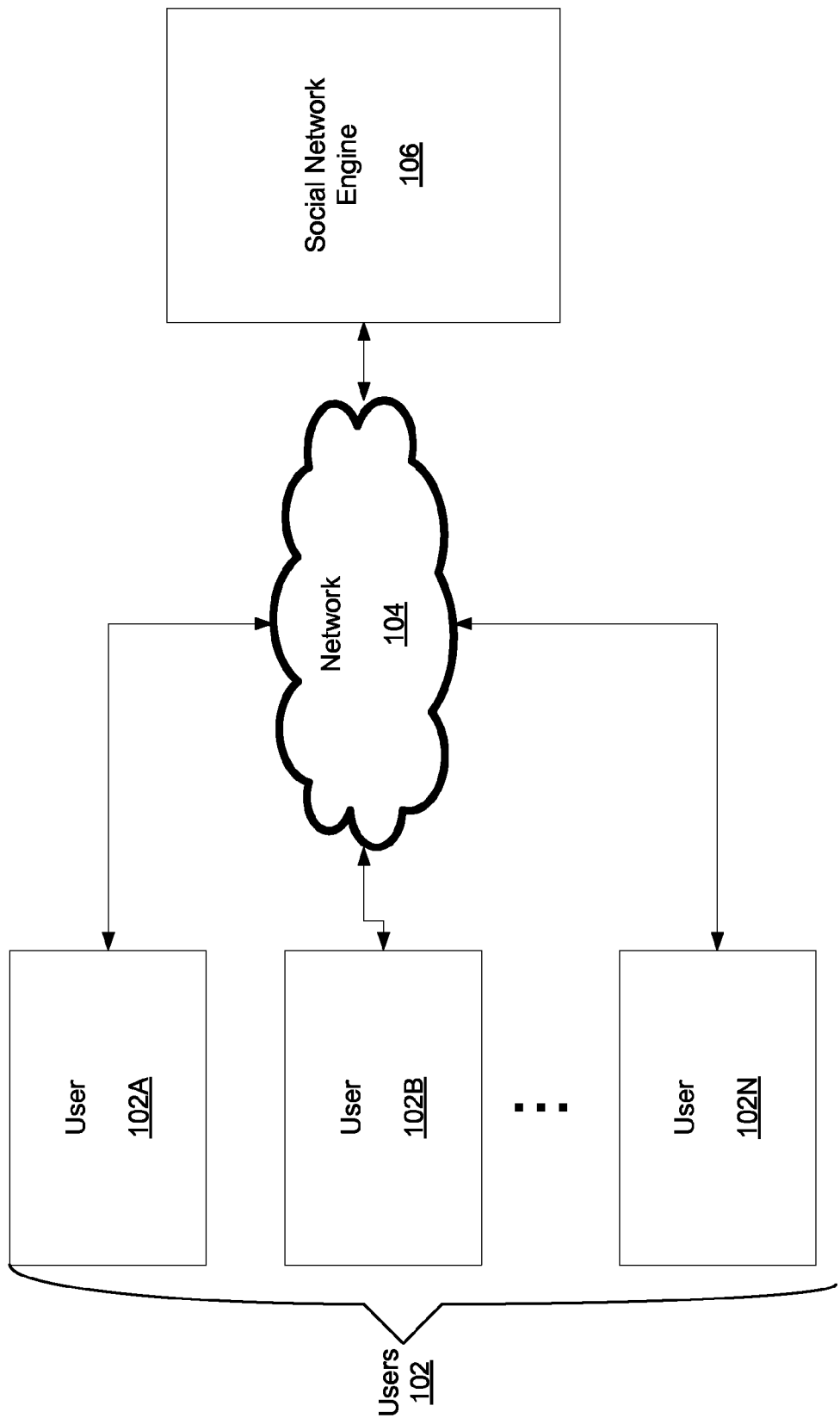
FIG. 1 is a block diagram of an exemplary environment for social mapping.

FIG. 1 is a block diagram of an exemplary environment for generating a social timeline. One or more users 102, such as a user 102A, a user 102B, and a user 102N, are in communication with a social network engine 106 via a network 104. The social network engine 106 may comprise a social networking website, one or more servers operating the social networking website, or any other device or application capable of providing social networking services via the network 104. The users 102 can access the services provided by the social network engine 106 via the network 104. Optionally, one or more of the users 102 may be able to access the social network engine 106 directly.

The users 102 may use a computing device, such as a laptop or desktop computer, a cellular telephone, a personal digital assistant (PDA), a set top box, and so forth to access the social network engine 106. The users 102 can view data about social network members, view a social timeline, enter data about themselves and possibly others, join social network groups, and so forth. The users 102 are typically members of a social networking website associated with the social network engine 106, for example, and thus comprise the social network members.

According to exemplary embodiments, a user 102, such as the user 102A, identifies one or more other members associated with the social network engine 106, such as the user 102B and the user 102N, with which the user 102A wants to build a relationship or establish or alter the details of an existing relationship. Using the social network engine 106, the user 102A enters the details about the relationship. The social network engine 106 then sends data comprising the details from the user 102A to the other users (i.e., user 102B and user 102N). The user 102B and the user 102N may then provide input in response to the data. The response may, for example, modify the data.

The relationship with the user 102B and the user 102N may confirmed, based on the input, by the social network engine 106. Alternatively, the existence of the relationship may be denied, according to some embodiments. Any type of confirmation and/or input may be utilized to alter, deny, and/or establish the relationship between the user 102A and the user 102B and the user 102N.

The relationship may comprise any type of relationship that exists between two of the users 102. For example, the user 102A and the user 102B may have worked together, been classmates, be related, have dated, and so forth. More than one relationship may exist between the two users. For example, the user 102A and the user 102B may have both worked together and dated.

The data may then be ordered. For example, the user 102A may specify that the relationship with the user 102B is older than the relationship with the user 102N. In other words, the user 102A may enter detailed data that indicates calendar dates, years, and other timing information about the relationship. The social network engine 106 can then order the data by the indicated times and generate a social timeline based on the ordered data. The social timeline may indicate when certain events related to the relationships occurred, for example, such as in the year 2004, the user 102A met the user 102B and traveled with the user 102B to Argentina. Any type of events, details, and other data related to the relationship may be provided by the users 102 and utilized to generate the social timeline.

Figure 2:
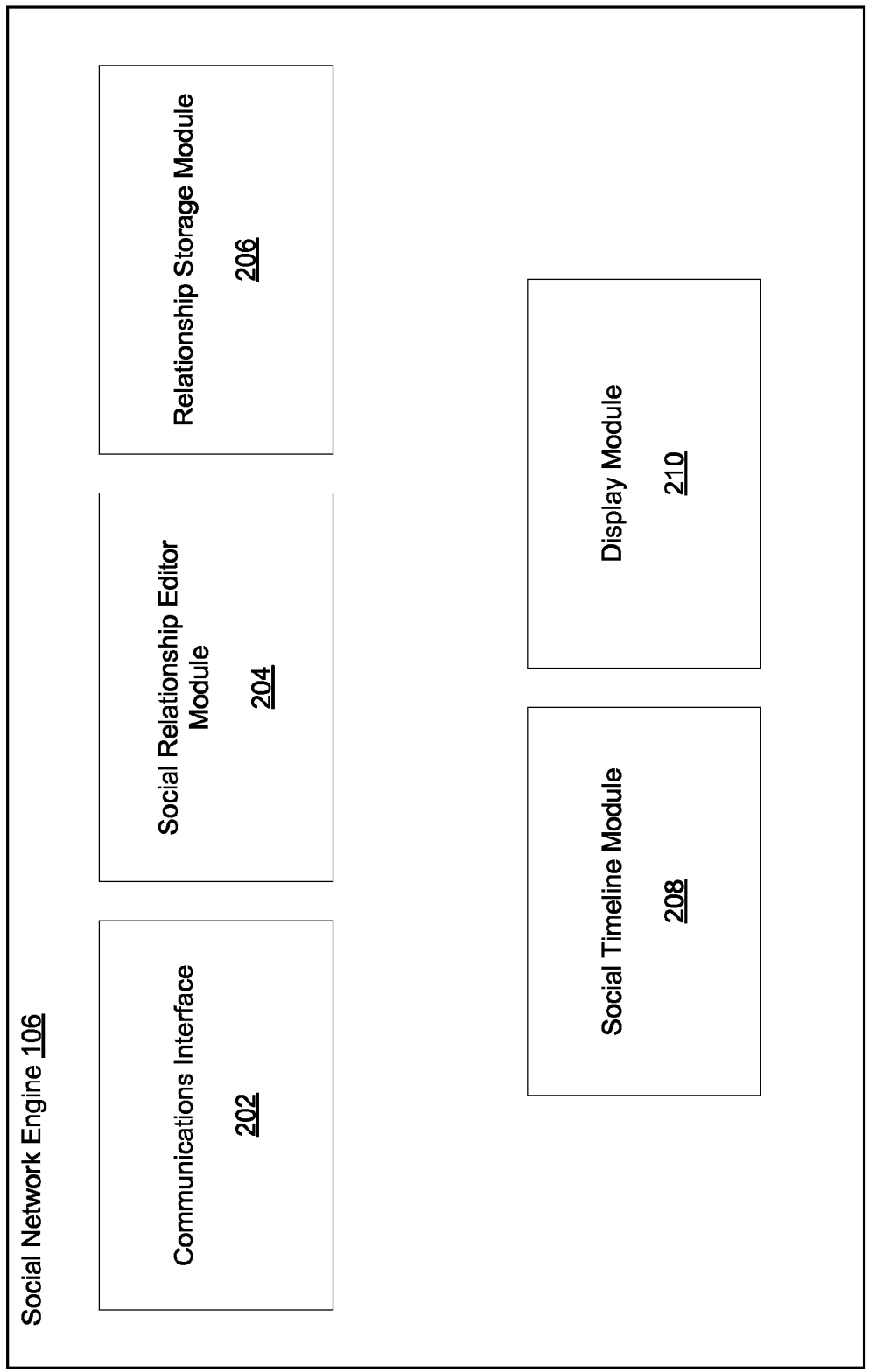
FIG. 2 illustrates an exemplary social network engine.

Referring now to FIG. 2, an exemplary social network engine is illustrated, such as the social network engine 106 discussed in FIG. 1. A communications interface 202 is provided in association with the social network engine 106 for receiving data from and sending data to the users 102. The users 102 can send any type of data to the social network engine 106 via the network 104 and vice versa. For example, a user 102 can provide details about relationships with other users 102 that the social network engine 106 can utilize to generate the social timeline for the user 102, such as the user 102A, based on the details.

Typically, the users 102 access a website associated with the social network engine 106. For example, the social network engine 106 may host a social networking website where the users 102 can visit to interact with one another. The website can display various types of data about the users 102 to one another, such as the social timeline, profile information, or relationships a particular user, such as the user 102A, has with other users, such as the user 102B and the user 102N. The users 102 may belong to particular communities within the social networking website, such as communities categorized according to school attended, workplace, geographical location, and so forth.

A social relationship editor module 204 is provided for editing and/or entering the social relationships that the users 102 have with one another. For example, the user 102A can specify a particular relationship with the user 102B and the user 102N. The user 102B and/or the user 102N may then be asked to confirm the particular relationship specified by the user 102A. Accordingly, each relationship established via the social networking website is verified by two or more of the users 102 in the relationship. A social relationship editor display page associated with the social relationship editor module 204 is discussed further in association with FIG. 4.

The social relationship editor module 204 can track the one or more relationships between the users 102. The social relationship editor module 204 can also generate and send communications to the users 102 to confirm the relationships identified. As discussed herein, the users 102 are typically members of the social networking website. Accordingly, the users 102 interact with one another via the social network website associated with the social network engine 106 and can identify relationships with one another in order to facilitate the interactions, or for any other reason.

The social relationship editor module 204 may also be utilized by the users 102 to enter data about the relationships with other users 102, as discussed herein. The data may then be utilized to generate the social timeline for the users 102, such as what events happened each day, month, or year to the user 102A.

A relationship storage module 206 is provided for storing one or more databases including the relationships between the users 102. The relationship storage module 206 can utilize any type of storage device or medium to store the database. For example, the relationship storage module 206 can store the databases in hard drives, on CD ROMS, in DRAM, and so forth. Any type of storage device or storage medium for storing information about the relationships, profile data associated with the users 102, or any other information associated with the users 102, is within the scope of various embodiments. According to some embodiments, the relationship storage module 206 can store the social timeline generated for each of the users 102.

A social timeline module 208 is also provided in association with the social network engine 106. The social timeline module 208 utilizes the relationship data provided by the users 102. The data provided by the users 102 about various relationships is then ordered by the times the relationships occurred, or events associated with the relationships occurred, as indicated by the users 102. For example, the user 102A may indicate that the user 102A took a class with user 102B in the Fall of 2003. The data about the class is then ordered in relation to other data provided by the user 102A and the social timeline for the user 102A is generated.

The user 102A may be able to request, via a button, portal, link, and so forth, a display page showing the social timeline associated with the user 102A. Other users 102 may also be able to request the social timeline for the user 102A. A different social timeline may be generated for different communities associated with the user 102A, such as one social timeline for the workplace community, another social timeline for a college community, etc.

A display module 210 may be associated with the social network engine 106. The display module 210 may generate a display for displaying the social timeline to the users 102. The social timeline may be displayed to the user 102 that provides the social timeline data items, such as events and timeframes associated with the events, or the social timeline may be displayed to other users 102 that want to see one another's social timelines. The user 102A may adjust privacy settings to identify other users 102 or groups of users 102 that can access the social timeline for the user 102A.

Although FIG. 2 shows various modules associated with the social network engine 106 (e.g., the communications interface 202, the social relationship editor module 204, the relationship storage module 206, and the social timeline module 208), fewer or more modules may be associated with the social network engine 106 and still fall within the scope of various embodiments.

Figure 3:
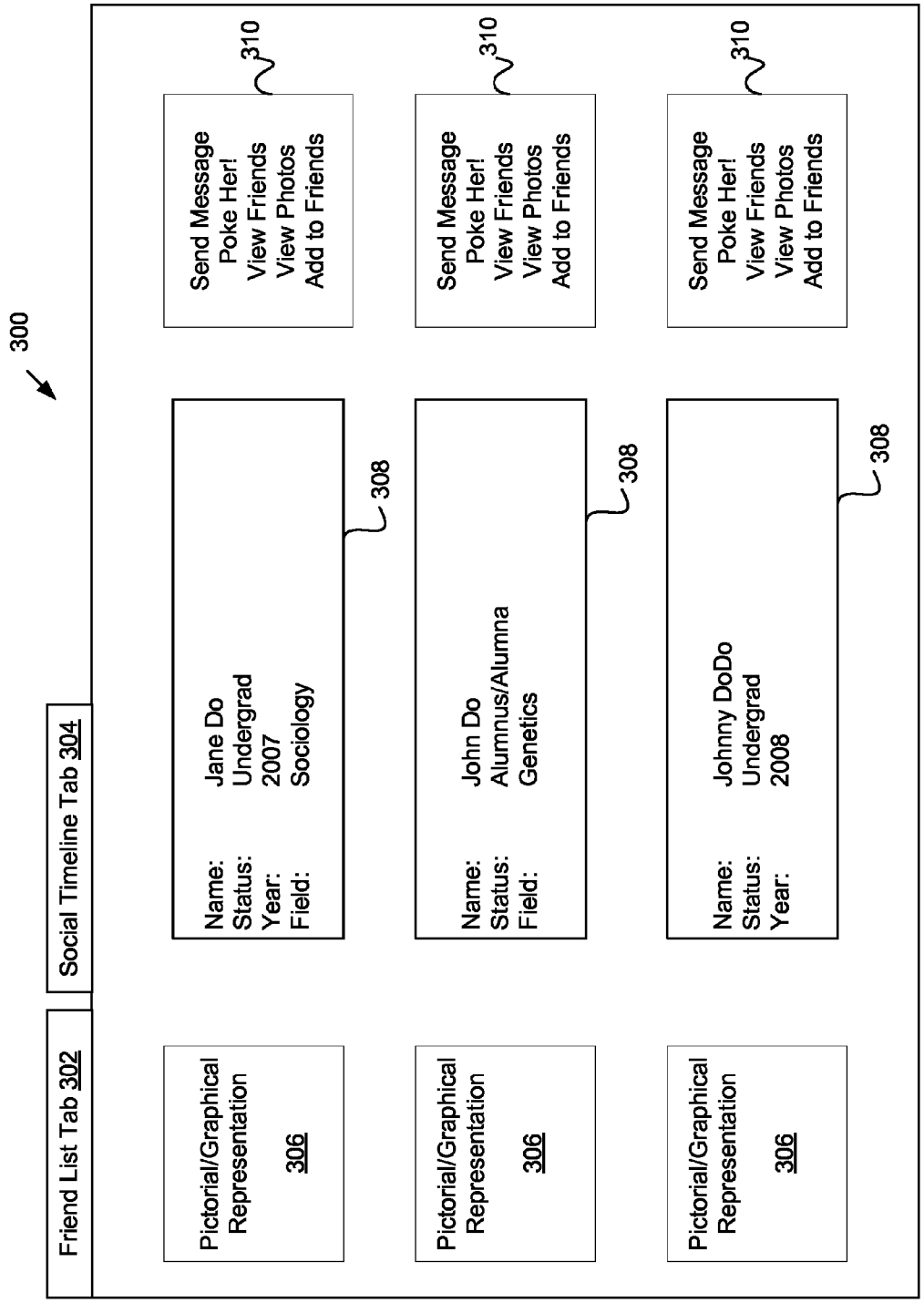
FIG. 3 illustrates an exemplary friends list.

FIG. 3 illustrates an exemplary friends list 300. The friends list 300 may be displayed on a page associated with the social network engine 106. The friends list 300 may be selected by the users 102 via a friends list tab 302. A social timeline tab 304 may also be selected. The social timeline tab 304 may display events associated with the relationships with friends on the friends list 300 according to a timeline.

A pictorial or graphical representation 306 for each of the users 102 may be included as part of the friends list 300. For example, the user 102A may utilize a photo of the user A 102, while the user 102B may utilize a cartoon character to represent the user 102B. Any type of picture, photo, graphic, icon, symbol, and so forth may be utilized to represent the users 102 via the pictorial or graphical representation 306.

Biographical data 308 is displayed about each of the users 102 that are listed. For example, the name, status, year of graduation, field of study, and so forth may be displayed as the biographical data 308 for each of the users 102. Any type of data about the listed users 102 may comprise the biographical data 308.

A user action area 310 may be associated with the friends lists 300 and may be displayed in association with each of the users 102. In FIG. 3, the user action area 310 is displayed to the right of the biographical data 308 for each of the users 102. However, the user action area 310, the biographical data 308, and/or the pictorial/graphical representation 306 may be displayed anywhere. For example, the pictorial/graphical representation 306 may be accessed, check-marked, highlighted, and so forth in order to display the user action area 310.

The user action area 310 allows the users 102 to select one or more actions to perform in association with a particular user, such as the user 102A, about which the biographical data 306 is being viewed. For example, the users 102 can choose to send the users 102 an email or other message via the "send message" function, to utilize a "poke her!" function to be directed to a pop-up or similar screen, confirming that the user 102 wishes to "poke" a displayed user. An announcement may be sent to the displayed user informing the displayed user that the displayed user has been "poked" by another user 102.

The user action area 306 may also allow the users 102 to utilize a "view friends" function" in order to view the data about friends of the users 102, to utilize a "view photos"

function to view photos associated with the user, and/or an "add to friends" function to request addition to a friends group of the user 102. Various other options may be accessed via the user action area 306. For example, the users 102 may be able to access stories about a particular user, such as the user B 102B, via the user action area 306.

For example, the users 102 can choose to send the users 102 an email or other message via the "send message" function, to utilize a "poke her!" function to be directed to a pop-up or similar screen, confirming that the user 102 wishes to "poke" a displayed user. An announcement may be sent to the displayed user informing the displayed user that the displayed user has been "poked" by another user 102.

The user action area 306 may also allow the users 102 to utilize a "view friends" function" in order to view the data about friends of the users 102, to utilize a "view photos" function to view photos associated with the user, and/or an "add to friends" function to request addition to a friends group of the user 102. Various other options may be accessed via the user action area 306. For example, the users 102 may be able to access stories about a particular user, such as the user B 102B, via the user action area 306.

The friends list 300 may be utilized for displaying any type of data about the users 102. The friends list 300 shown in FIG. 3 is an exemplary display page for displaying data about various users belonging to a community. Profile data about individual users or groups of users is shown via the friends list 300. Data about the users 102 belonging to various communities, stories about the users 102, and so forth, may also be displayed via the friends list 300, or any other display page.

The friends list 300 in FIG. 3 may also be utilized, according to exemplary embodiments, to display a social timeline associated with the friends on the friends list 300. The friends list 300 may be generated by the social relationship editor module 304 and be displayed in response to a search or filter function initiated by the user 102A. As discussed herein, the data about the users 102 for the friends list 300 may be stored in a database by the relationship storage module 206 or another storage module (not shown) for storing data about the users 102.

The friends list 300 may be utilized to display a directory of the users 102, a collection of the users 102, a directory of established relationships associated with the user 102A, or any other information about the users 102. As discussed herein, any of the data associated with the users 102 may be displayed utilizing the friends list 300 or any other display mechanism associated with the social network engine 106.

The friends list 300 can also display the users 102 in an ascending or descending order according to a chronology associated with the relationships the users 102 have with other users, such as by generating the social timeline discussed herein. For example, the user 102N may be displayed before the user 102B in a listing requested by the user 102A because the user 102A has known the user 102N for a longer period of time than the user 102B. The users 102 can be displayed according to common groups, association with common events, situations, or occurrences, and so forth.

Figure 4:
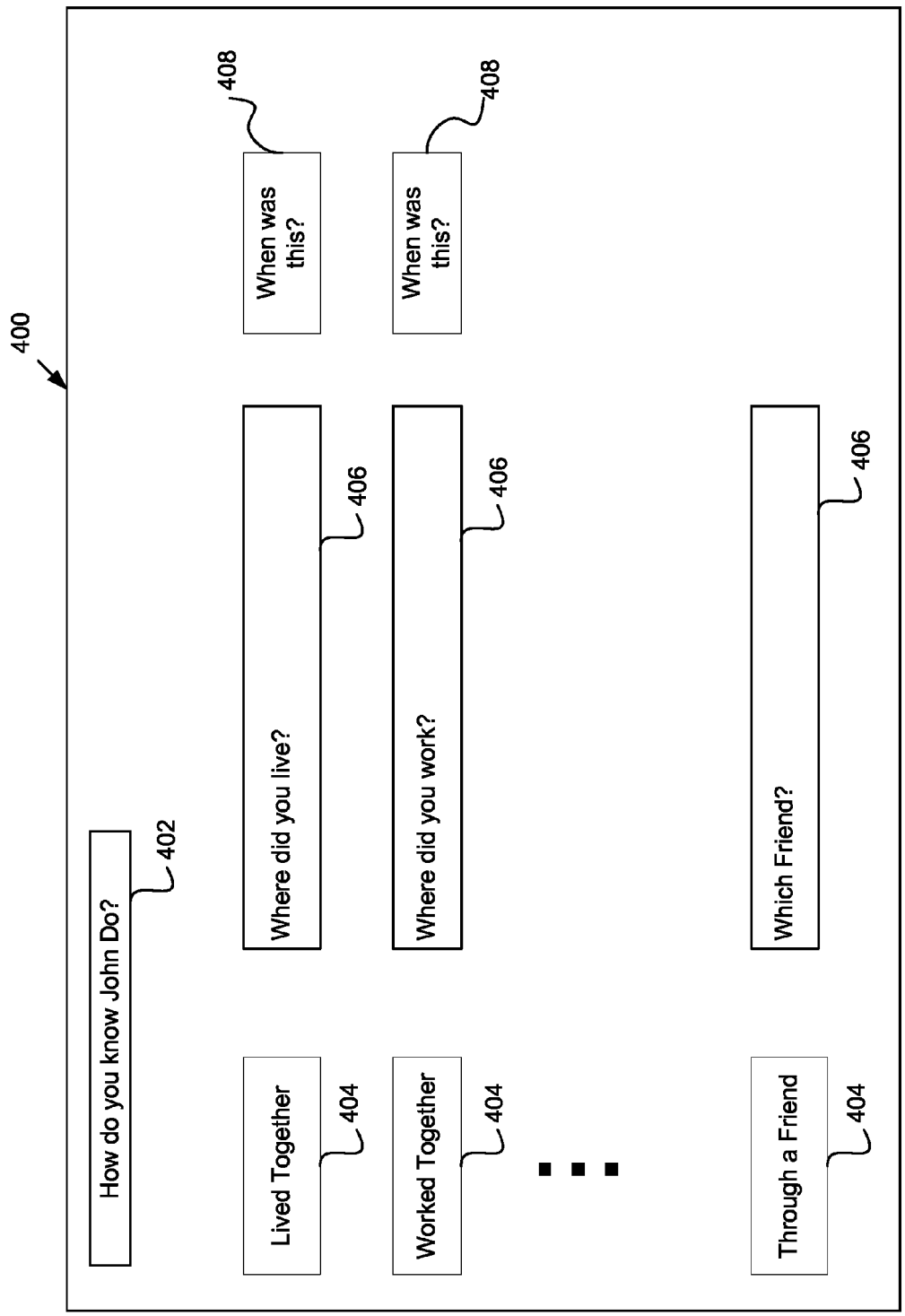
FIG. 4 illustrates an exemplary relationship editor page.

FIG. 4 illustrates an exemplary relationship editor page 400. The relationship editor page 400 illustrated in FIG. 4 can be utilized to question the users 102 about the relationships with other users 102. The relationship editor page 400 may be utilized to learn details about the relationships, such as timing information for generating the social timeline. The relationship editor page 400 may be sent in response to a request from a particular user, such as the user 102A, to form or otherwise establish a relationship with another user, such as the user 102B, and/or to edit details about the relationship, such as providing details about specific events and/or timeframes associated with the specific events.

A relationship inquiry 402 may be utilized to establish the subject matter for the relationship editor page 400. For example, FIG. 4 illustrates the relationship editor page 400 for the relationship inquiry 402 "How do you know John Do?" However, the relationship inquiry 402 may comprise any inquiry, such as "Is the information provided by John Do about your relationship accurate?" Any type of relationship inquiry 402 may be provided in association with the relationship editor page 400.

A relationship type identifier 404 may be displayed for allowing a user 102 to select and/or identify the relationship the user 102 has with other users 102. For example, the user 102A may select that the user 102A lived with the user 102B, worked with the user 102B, and/or knows the user 102B through a friend. One or more of the relationship identifiers 404 may be selected. As discussed herein, the users 102 may have more than one relationship.

A relationship details identifier 406 allows the users 102 to further specify the nature of the relationship. For example, the relationship details identifier 406 may establish where the users 102 lived together, where the users 102 worked together, which friends the users 102 have in common, and so forth. Although only one relationship details identifier 406 is illustrated for each relationship type identifier 404, more than one relationship details identifier 406 associated with each of the relationship type identifiers 404 may be provided.

A timeframe identifier 408 may also be provided in association with the relationship editor page 400. The timeframe identifier 408 may be utilized to establish a time or timeframe associated with the relationship type identifier 404. For example, the timeframe identifier 408 can specify when the users 102 lived together, worked together, dated, and so forth. The timeframe identifier 408 data may then be ordered and utilized to generate the social timeline, discussed herein.

The relationship inquiry 402, the relationship type identifier 404, the relationship details identifier 406, and/or the timeframe identifier 408 may be selectable via a drop down menu, a text entry box, a check box, and/or via any other selection method or combination of selection methods. According to some embodiments, the relationship inquiry 402 is pre-populated with selections when sent to the users 102 with whom confirmation of the relationship is sought. Further, the relationship editor page 400 can be automatically populated, partially or wholly, utilizing data already stored about the users 102 and/or the relationships the users 102 have established with one another on previous occasions. For example, the relationship editor page 400 can be sent to the user 102A to confirm that the timeframe data about the relationship specified by the relationship editor page 400 is correct.

The arrangement, presentation, display, and/or subject matter described in connection with FIGS. 3 and 4 may vary and still remain within the scope of various embodiments. Additional timeframe questions may be utilized in association with the social relationship page 400 or additional types of the biographical data 304 may be displayed via the friends list 300.

For example, the user 102A may complete the relationship editor page 400 by selecting from the relationship inquiry 402, the relationship type identifier 404, the relationship details identifier 406, the timeframe identifier 408, and/or any other identifiers that may be provided via the relationship editor page 400, in order to provide details about the relationship the user 102A has with the user 102B. The user 102B may then be sent the pre-populated relationship editor page 400 and asked to confirm the data provided by the user 102A. The user 102B can confirm the accuracy of the data on the relationship editor page 400, modify the data on the relationship editor page 400, add to the data on the relationship editor page 400, and/or deny the accuracy of the data on the relationship editor page 400.

The details about the relationship established via the relationship editor page 400 can be stored by the relationship storage module 206 and a relationship database utilized to access timeframe information provided by the user 102 about each data item to organize the data items provided by the users 102 associated with the relationships between the users 102 and to generate the social timeline. Alternatively, the social timelines or timeline data from the user 102B may be utilized to populate times for the data items associated with the user 102A, such as when the user 102A fails to provide the times associated with the data items.

The subject matter of the inquiries and the data associated with the relationship editor page 400 may include any topics, such as membership in a club, a team, a church, etc.; common courses, classes, institutions, programs of study, etc.; common travels, journeys, adventures, parties, conferences, etc.; common familial relationships, friends, acquaintances, romantic partners or interests, musical interests, restaurants, bars, pubs, etc.; whether two or more of the users 102 met randomly, accidentally, purposefully, via online activities, etc.; and/or whether two or more of the users 102 have never met, etc. Any type of data can be established via the relationship editor page 400, as discussed herein.

As discussed herein, a confirmation request may be sent to the users 102 in response to completion of the relationship editor page 400. The social relationship editor module 204 can send a communication, for example, to the user 102B that the user 102A selected the user 102B as a person the user 102A may know or with whom the user 102A wishes to establish a relationship. The user 102B may elect to confirm the data provided by the user 102A, adjust or edit the data, send a message to the user 102A regarding the relationship, deny the existence of the relationship, add data about the relationship, and so forth. If the user 102B edits or adds to the data, the user 102A may be asked to confirm the added or edited data, according to exemplary embodiments.

According to some embodiments, the user 102A may complete portions of the relationship editor page 400, while leaving other portions for the user 102B to complete. For example, the user 102A may want the user 102B to complete portions of the relationship editor page 400 describing timeframes for the relationship between the user 102A and the user 102B.

Figure 5:
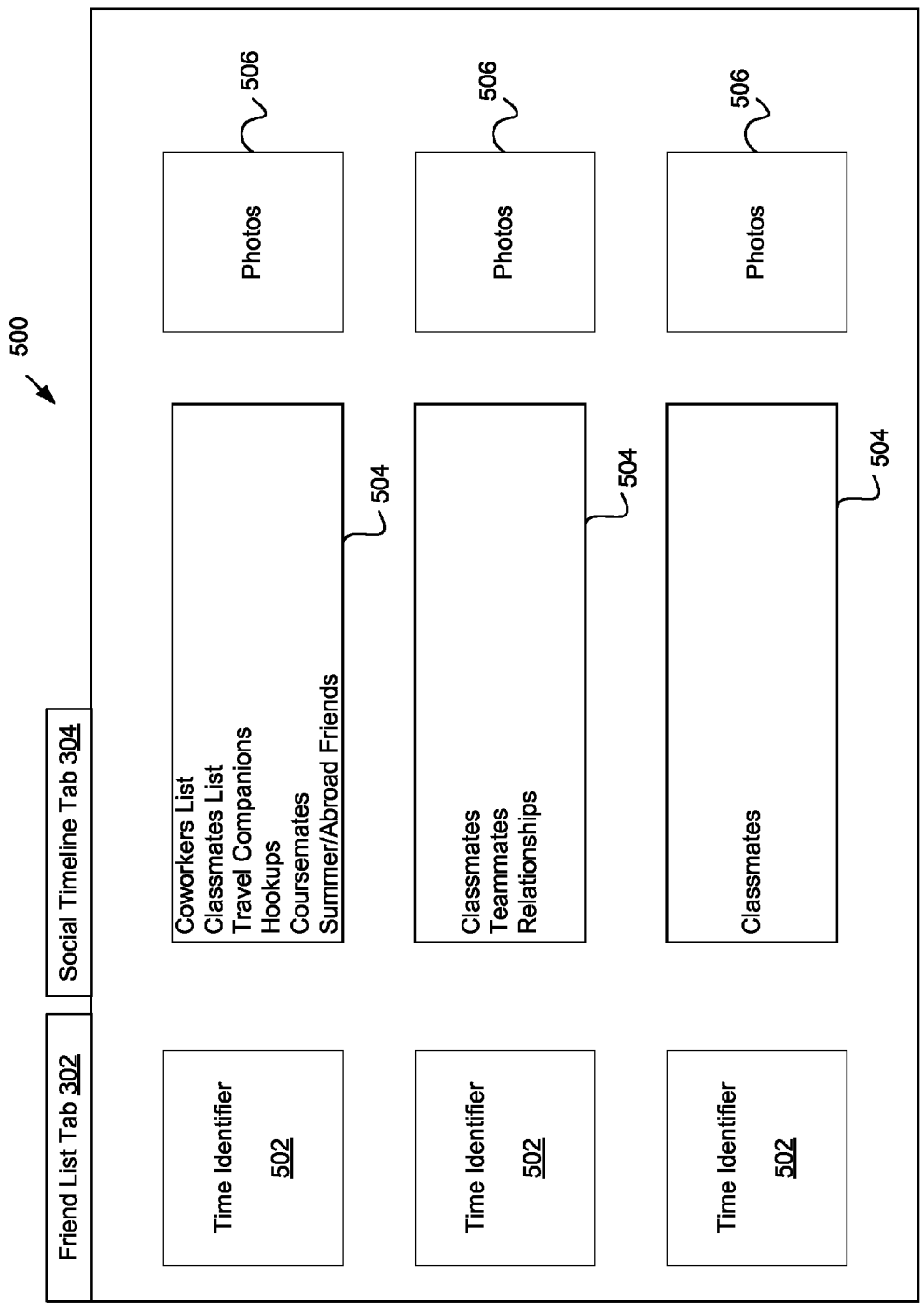
FIG. 5 illustrates an exemplary social timeline.

Referring to FIG. 5, an exemplary social timeline page 500 is illustrated. The social timeline page 500 may be accessed via the social timeline tab 304 discussed in FIG. 3 or in any other manner, such as via a link, a button, a search request, and so forth.

A time identifier 502 is displayed on the social timeline page 500. The time identifier 502 indicates the time in which events or other data items associated with the user 102A may be displayed. The social timeline page 500 for the user 102A may include events associated with each relationship the user 102A has with other users 102. The data about the relationships, such as classes taken with other users 102, timeframe the user 102A dated another user 102, etc. may be ordered according to dates within the time identifier 502, the dates or times for each of the data items provided by the user 102A. The data may then be displayed within the time identifier 502 according to an ascending or descending order, for example.

A member list 504 may be displayed according to the time identifier 502, according to some embodiments. As shown in FIG. 5, the member list 504 includes names of members grouped under various categories, such as coworkers, classmates, travel companions, hookups, coursemates, summer/abroad friends, relationships, teammates, and so forth. The member list 504 may include the names of the members that the user 102A met in the year specified, for example. Any of the users 102 can click on, or otherwise access, the name of a particular member (i.e., users 102) to access further data about timeframes associated with the user 102A's relationship with the particular member, depending upon the privacy settings selected by the user 102A.

Photos 506 may be displayed in association with each of the time identifiers 502 listed as part of the social timeline page 500. According to some embodiments, a user 102 may click on the photos 506 to access specific timeframe data about the user 102A's relationship with the users 102 in the photos 506. Other users 102 can also submit photos that correlate with the time identifier 502 specified on the social timeline page 500. Any type of data can be utilized to generate the social timeline and to be displayed via the social timeline page 500. Further, some of the time identifiers 502 may not have any names or events listed.

The photos 506 may be selected automatically, based on profiles associated with the users 102 or any other data. The photos 506 may be automatically updated when a user 102 uploads or otherwise provides updated photos 506 that the social network engine 106 determines to be relevant to the social timeline. According to some embodiments, the user 102 can approve or reject added or edited photos, such as the photos 506 shown in FIG. 5, before the photos 506 are uploaded or otherwise provided for display with the social timeline.

According to exemplary embodiments, a social timeline for each of the users 102 may be displayed. The social timeline for each of the users 102 may list all of the events or other data pertaining to the relationship a particular user 102, such as the user 102A, has in common with one or more of the other users 102. For example, a social timeline for user A's 102A relationship with the user 102B may be generated. The social timeline in this example may list the events the user 102A and the user 102B had in common for each year, such as the user 102A and the user 102B traveled to Mexico together in March of 2003, attended a New Year's party together in January of 2004, threw a summer barbeque together in June of 2004, and so forth. The time identifier 502 may utilize any increment of time, such as day, month, every two years, etc. to display a list of names, events, and so forth associated with the users 102.

The social timeline module 208 may generate and/or display the social timeline page 500, according to some embodiments. However, any module, application, device, or component can generate and/or display the social timeline page 500. Any type of data may be utilized to generate the social timeline and any process may be employed for generating the social timeline, according to some embodiments.

According to some embodiments, some or all of the data from the relationship editor page 400 may be referenced to generate the social timeline. The social timeline may be generated automatically or triggered by the users 102, such as by requesting the social timeline, as discussed herein. Other sources of the data for generating the social timeline may also be accessed, such as data from users' 102 profiles, data from stories about the users 102, etc.

The chronological listing in descending order or ascending order may be included in the social timeline, as discussed herein. For example, dates may be listed in descending order down the left hand side of the social timeline page 500 in the form of month/date/year. Categories of events, situations, interactions, experiences, and so forth that correspond with the chronological listing may be generated or utilized to describe the social timeline. The data may be formatted or placed in a variety of positions on the social timeline page 500. Names of individuals that correspond with various categories may be displayed ion proximity to the categories, for example, as shown in FIG. 5.

Exemplary embodiments of the social timelines represent tools that may represent the way in which the users 102 interact with one another via the social networking website or otherwise. The social timeline may be monitored, edited, and so forth to view the interactions and timeframes associated with the interactions of the various users 102. The social timeline may be utilized, according to some embodiments, to measure the roles and influences the users 102 have on one another.

According to some embodiments, the users 102 may click on a date, name, event, etc. on the social timeline to access additional data about the date, name, or event. By clicking on, or otherwise accessing, the date, name, event, or other data displayed as part of the social timeline, other users 102 may input data to request a change or update to the social timeline. The social timeline may be updated or otherwise edited by the user 102 for which the social timeline is generated, or by other users 102, according to some embodiments.

The social timeline may be utilized to generate stories for the users 102 according to some embodiments. For example, a story about user B's 102B travels in 2005 may be sent to the user 102A based on the fact that the user 102B is listed on the social timeline for the user 102A. Any type of story may be generated or identified for the user 102A based on the social timeline.

Figure 6:
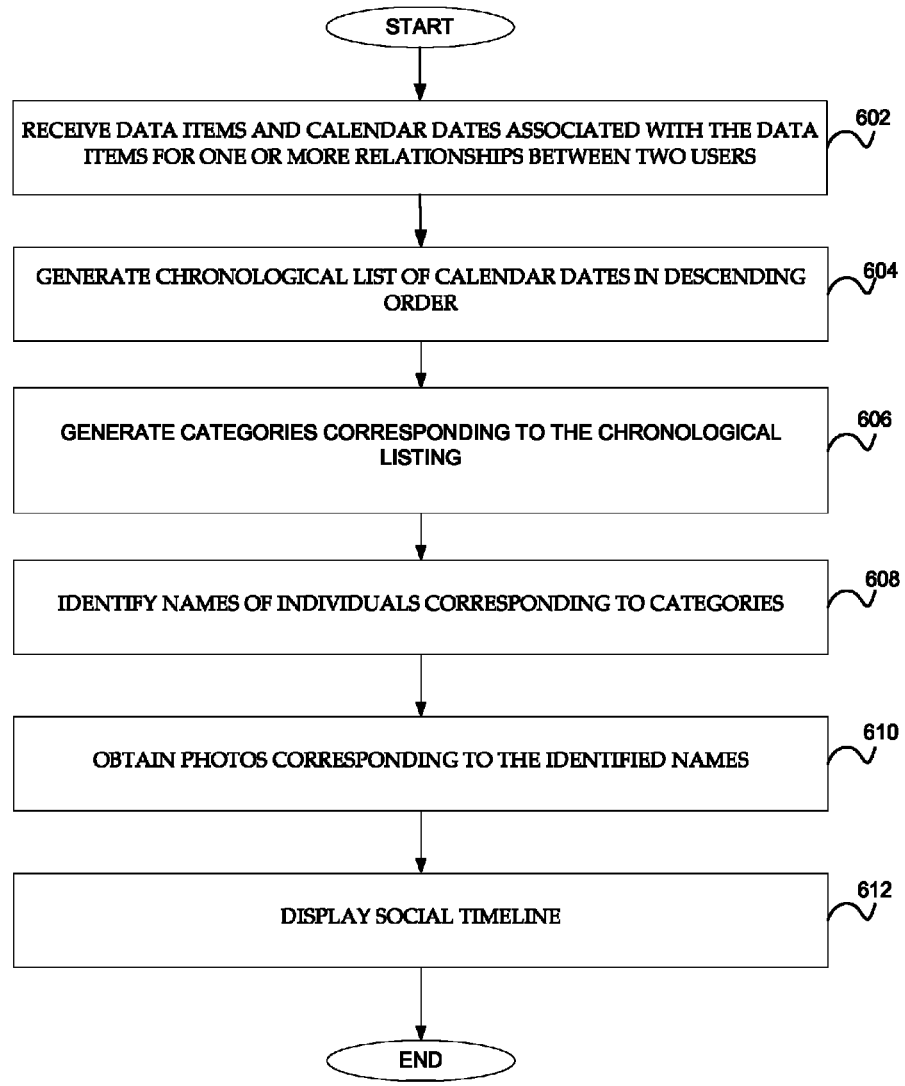
FIG. 6 is a flow diagram of an exemplary process for ordering data for a social timeline.

FIG. 6 is a flow diagram of an exemplary process for ordering data for a social timeline. At step 602, data items and calendar dates associated with the data items for one or more relationships between two users are received. The user 102A can provide the data items, such as events, and calendar dates associated with the events about the user 102A's relationship with 102B.

At step 604, a chronological list of calendar dates in descending order is generated. For example, the social timeline module 208 may access data from the relationship storage module 206 to generate the chronological list. The chronological list may be generated for each relationship, for a group of relationships, such as the user A's 102A college community and work community, and/or for any other relationship.

The chronological list may include all of the data about the relationships provided by the user 102 for whom the social timeline is generated and/or the data from other users 102 with which the user 102 has relationships. For example, the user 102A may indicate that the user 102A has a relationship with the user 102B, but the data from the user 102B may need to be accessed in order to confirm the dates or timeframe associated with the relationship between the user 102A and the user 102B.

At step 606, categories corresponding to the chronological listing are generated. As discussed herein, the chronological listing may be generated for all of the timeframe data associated with the relationships. The chronological listing may then be divided according to categories, such as groups, communities, and so forth. For example, the chronological listing for the user 102A may be assigned the categories of a work group, a college group, and a friends group, associated with the user 102A.

At step 608, the names of individuals corresponding to the categories are identified. As shown in FIG. 5, the social timeline page 500 may display the names of individuals, such as other users 102, within groups or communities. For example, the names of individuals that are coworkers, classmates, travel companions, and so forth may be displayed under the relevant category according to the time identifier 502 in which the user 102A met or otherwise associated with the individuals.

At step 610, photos corresponding to the identified names are obtained. As discussed herein, the photos 506 may include pictures of each of the users 102 associated with the identified names or with some of the users 102 associated with the identified names or any other photos obtained from the users 102 or provided by the users 102.

At step 612, the social timeline is displayed, for example, as illustrated by the social timeline display page 500. The social timeline can be updated according to new data, reordered data based on new dates or timeframes provided, and so forth. For example, the user 102A may add the user 102N as a new friend in the coworkers category. The user 102N may then be added to the social timeline according to the dates provided by the user 102A. The user 102N may be a new individual that the user 102A has met or the user 102N may be an individual the user 102A has known previously, but with whom the user 102A has added a new relationship.

Figure 7:
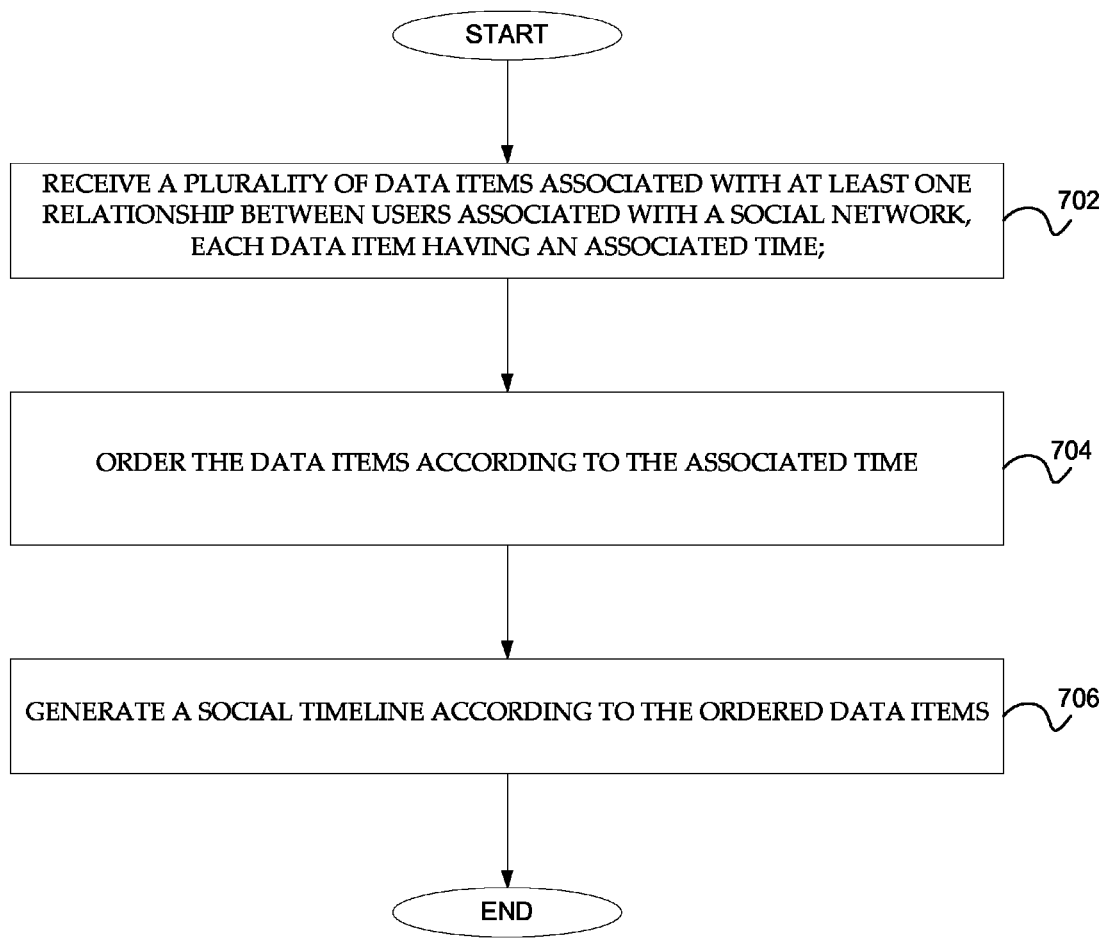
FIG. 7 is a flow diagram of an exemplary process for generating a social timeline.

FIG. 7 is a flow diagram of an exemplary process for generating a social timeline. At step 702, a plurality of data items associated with at least one relationship between users associated with a social network are received, each data item having an associated time. For example, the user 102A can provide events and times associated with the events about a relationship with the user 102B via the relationship editor page 400 or via any other interface. The user 102A can provide any type of data items about the relationship, such as a type of relationship, events associated with the relationship, a timeframe associated with the relationship and/or events, other users 102 associated with the events, and so forth. As discussed herein, the data may be received from a questionnaire presented to the users 102 by the relationship editor page 400.

At step 704, the data items are ordered according to the associated time. As discussed herein, the data provided by the user 102A may be ordered to generate a chronological listing. For example, the data about the user A's 102A relationship with the user 102B and the user 102N may be compared and listed according to dates associated with the relationships with the user 102B and the user 102N. If the user 102B and the user 102N are in different categories, such as the user 102B is from work, while the user 102N dated the user 102A, different chronological listings may be generated for each of the user 102B and the user 102N. The data may also be ordered according to one chronological listing that indicates the timeframes of all of the various relationships.

At step 706, a social timeline is generated according to the ordered data. As discussed herein, the social timeline may be displayed, for example, the social timeline page 500 of FIG. 5. The social timeline may include a listing by any increment of time, such as year, month, day, and so forth, of relationships the users 102 have with other users 102. As discussed herein, the social timeline may include all of the relationships, relationships according to categories, and/or individual relationships. Thus, a different social timeline may be generated and/or displayed for each of the users 102.

While various embodiments have been described above, it should be understood that they have been presented by way of example only, and not limitation. For example, any of the elements associated with the social network engine 106 may employ any of the desired functionality set forth hereinabove. Thus, the breadth and scope of a preferred embodiment should not be limited by any of the above-described exemplary embodiments.

What is claimed is:

1. A computer-implemented method comprising:
maintaining in a computer system a plurality of relationships among a plurality of users of a social networking system, the relationships comprising a connection between a first user and a second user of the social networking system;
receiving, from the first user, information at a social networking system about an action, the information identifying the second user of the social networking system as associated with the action and timing information about the action;
generating a social timeline comprising a visual representation of actions in common between the first and second users, the actions in common comprising the action received from the first user identifying the second user ordered using the timing information; and
sending the social timeline for display to a viewing user of the plurality of users of the social networking system.

2. The method of claim 1, wherein the actions in common comprise information about an event in common between the first user and the second user.

3. The method of claim 1, wherein one or more of the actions in common comprise one or more of: having worked together, having been classmates, having dated, having been at school together, having traveled together, and having been on a team together.

4. The method of claim 1, wherein the viewing user is the first user.

5. The method of claim 1, wherein the viewing user has a connection in the social networking system with at least one of the first user and the second user.

6. The method of claim 1, wherein sending the social timeline is responsive to a request from the viewing user for a social timeline between the first and second users.

7. The method of claim 1, further comprising:
determining a group in which the viewing user is a member, wherein the social timeline is generated based on the determined group.

8. The method of claim 1, wherein the social timeline is generated according to privacy settings selected by at least one of the first and second users.

9. The method of claim 1, wherein the first and second users are identified based on a friends list displayed to the viewing user.

10. The method of claim 9, wherein the friends list displayed to the viewing user is generated using a filter function.

11. The method of claim 1, further comprising:
selecting a picture associated with the action received from the first user identifying the second user; and
including the selected picture in the visual representation of the action.

12. A computer-implemented method comprising:
maintaining in a computer system a plurality of relationships among a plurality of users of a social networking system, the relationships comprising a connection between a first user and a second user of the social networking system;
receiving, from a viewing user, information at a social networking system about an action, the information identifying the first user and the second user as associated with the action and timing information about the action;
generating a social timeline comprising a visual representation of actions in common between the first user and the second user, the actions in common comprising the action received from the viewing user identifying the first user and second user as associated with the action and ordered using the timing information; and
sending the social timeline for display to the viewing user of the plurality of users of the social networking system.

13. The method of claim 12, wherein one or more of the actions in common comprise information about an interaction between the first user and the second user, the interaction comprising one or more of: having worked together, having been classmates, having dated, having been at school together, having traveled together, and having been on a team together.

14. The method of claim 12, wherein sending the social timeline is responsive to a request from the viewing user for a social timeline between the first and second users.

15. The method of claim 12, further comprising:
determining a group in which the viewing user is a member,
wherein the generated visual representations are selected based on the determined group.

16. The method of claim 12, wherein the social timeline is generated according to privacy settings selected by at least one of the first and second users.

17. The method of claim 12, wherein the first and second users are selected based on a friends list displayed to the viewing user.

18. The method of claim 17, wherein the friends list displayed to the viewing user is generated using a filter function.

19. The method of claim 1, further comprising:
selecting a picture for at least one of the actions in common between the first user and the second user; and
including the selected picture in the visual representation of the at least one of the actions in common between the first user and the second user.

20. A computer-implemented method comprising:
maintaining in a computer system a plurality of relationships among a plurality of users of a social networking system, each relationship comprising a connection between at least two users of the social networking system;
receiving a plurality of data items from a subset of the plurality of users, each data item comprising information identifying a first user and a second user of the social networking system associated with an action;
receiving timing information about a time associated with one or more of the plurality of data items;
identifying the plurality of data items that identify the first and second users;
generating a visual representation for each of the identified data items, each visual representation comprising information identifying the first and second user that corresponds to the identified data item;
generating a social timeline, the social timeline comprising the visual representations, at least two of which are ordered chronologically using the timing information; and
sending the social timeline for display to a viewing user of the plurality of users of the social networking system.

21. The method of claim 20, further comprising:
determining a group in which the viewing user is a member, wherein the social timeline is generated based on the determined group.

22. The method of claim 20, wherein the social timeline is generated according to privacy settings selected by at least one of the first and second users.

23. The method of claim 20, wherein the first and second users are selected based on a friends list displayed to the viewing user.

24. The method of claim 23, wherein the friends list displayed to the viewing user is generated using a filter function.

25. The method of claim 20, wherein generating a visual representation at least one of the identified data items comprises:
selecting a picture for the at least one identified data item; and
including the selected picture in the visual representation of the at least one data item.

* * * * *